Figure 4:
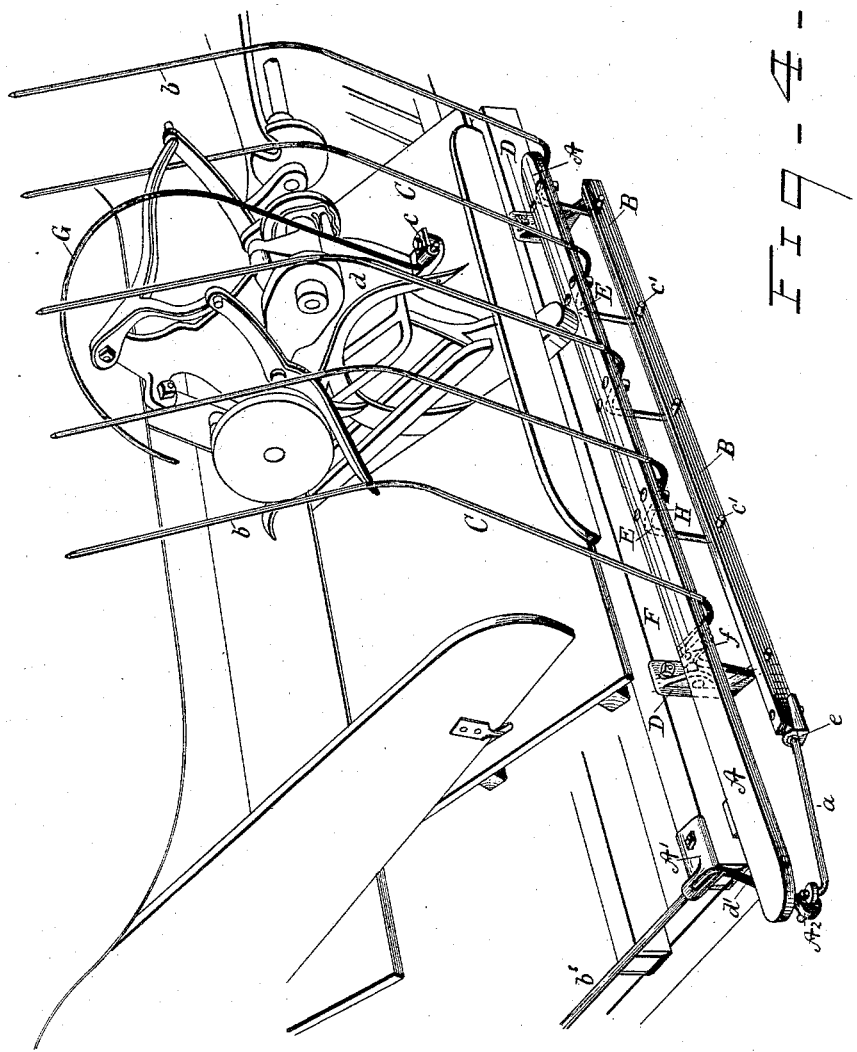

(No Model.) 2 Sheets—Sheet 1.
G. H. HOWE.
SHEAF CARRIER AND DUMPER FOR HARVESTERS.
No. 456,825. Patented July 28, 1891.
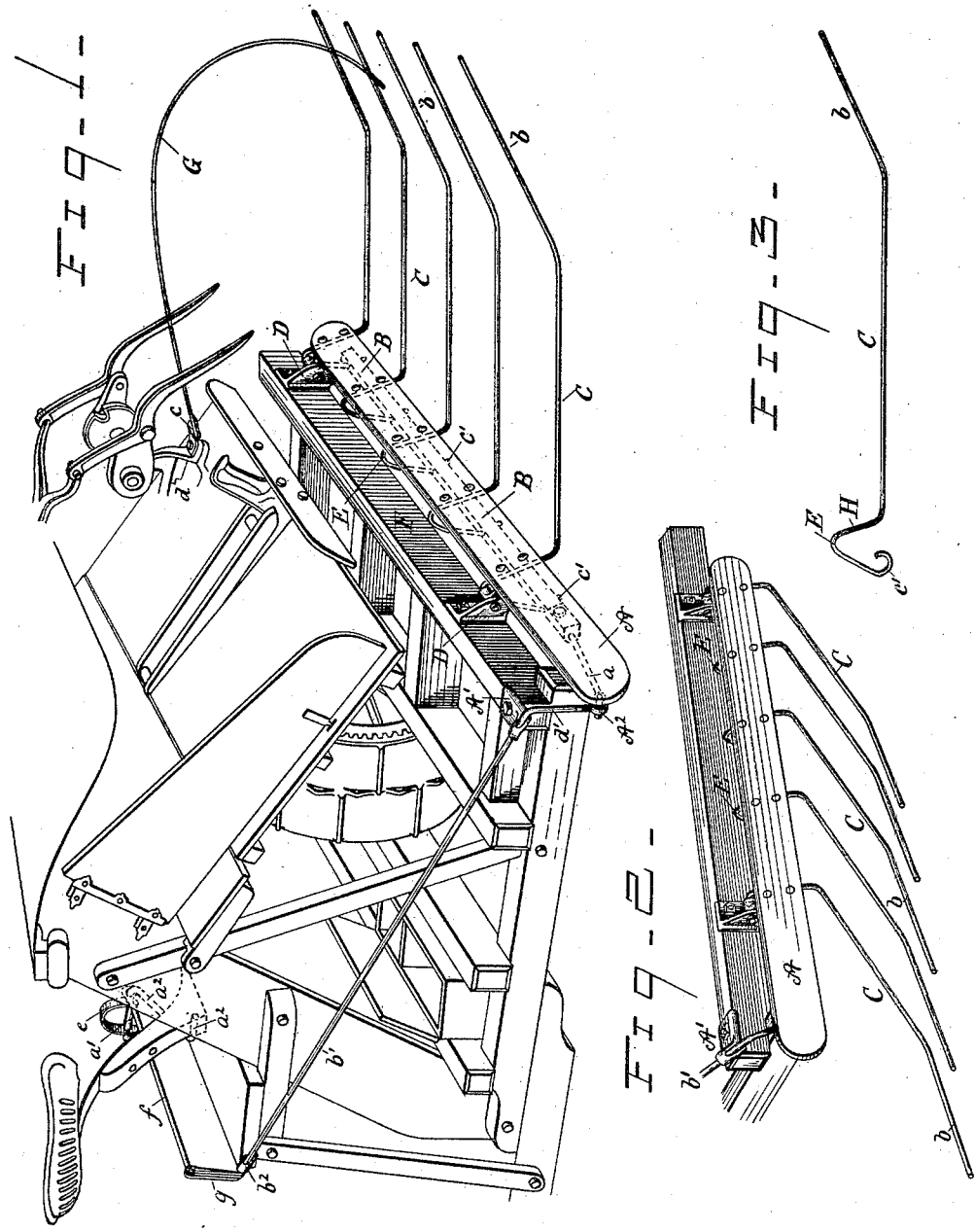
Witnesses
G. W. B. Masson
E. C. Wurdeman
Inventor:
George Hutchins Howe
by E. E. Masson
atty.

(No Model.) 2 Sheets—Sheet 2.

G. H. HOWE.
SHEAF CARRIER AND DUMPER FOR HARVESTERS.

No. 456,825. Patented July 28, 1891.

Witnesses
W. B. Masson
E. C. Wurdeman

Inventor:
George Hutchins Howe
by E. E. Masson
atty.

UNITED STATES PATENT OFFICE.

GEORGE HUTCHINS HOWE, OF HOOSICK FALLS, NEW YORK, ASSIGNOR TO THE WALTER A. WOOD MOWING AND REAPING MACHINE COMPANY, OF SAME PLACE.

SHEAF CARRIER AND DUMPER FOR HARVESTERS.

SPECIFICATION forming part of Letters Patent No. 456,825, dated July 28, 1891.

Application filed May 4, 1885. Serial No. 164,370. (No model.) Patented in England May 15, 1885, No. 5,992.

*To all whom it may concern:*

Be it known that I, GEORGE HUTCHINS HOWE, of the village of Hoosick Falls, in the county of Rensselaer and State of New York, have made certain new and useful Improvements in Sheaf Carriers and Dumpers for Harvesters, (for which Letters Patent of Great Britain were issued May 15, 1885, No. 5,992;) and I do declare the following to be a full, clear, and accurate description thereof, reference being had to the accompanying drawings, making a part of this specification, in which—

Figure 1 is a view in perspective of a portion of a harvester with the sheaf-carrier attached. Fig. 2 is a view in perspective of the sheaf-carrier detached from the harvester and in position when the sheaf is discharged. Fig. 3 is a view in elevation of one of the fingers which support the sheaves. Fig. 4 is a view in perspective of a portion of the machine with the sheaf carrier and dumper turned up in order to narrow the machine to pass through narrow gateways.

Similar letters of reference in the several figures represent the same parts.

To enable others skilled in the art to make and use my invention, I will proceed to describe the same with reference to the drawings.

In the drawings, the sheaf-carrier is shown as attached to a harvester, which elevates the grain as it is cut over the driving-wheel of the machine and delivers it to a binding-platform, where it is bound and then discharged by suitable mechanism one sheaf at a time into the sheaf-carrier, and when a sufficient number of bundles are accumulated the driver in his seat discharges the same upon the ground at will. By this means the accumulation of sheaves may be carried and deposited in heaps contiguous to each other, and thus save a large amount of labor in carrying the sheaves together to form a shock. This construction of a sheaf carrier and dumper may be applied to any other form of harvester, and I do not confine myself to its attachment to this particular type or form of harvester, as it may be readily attached to other forms known as "low-down machines or reapers."

In Fig. 1 is shown a portion of the frame and of the harvester with its driving-wheel and the platform of an automatic binder, together with the arms which discharge the sheaf into the carrier.

Another object of my invention is to provide a simple and effective means where it is not desired to leave several sheaves in heaps to be shocked, but to deliver them on the ground as they are bound, owing to the crop being wet or green, to hold the last sheaf cut before reaching the corner, and carry it around the corner to avoid its being trampled on by the team in the next round.

F is the end piece or girt of the main frame, and to this I hinge the inclined board A nearly parallel to it with hinges D. Passing through the board from one edge to the other or through staples or eyes fastened to it are a series of rods C, which in their receiving position at right angles to the line of draft form a cradle-shaped receptacle. The rods C are bent slightly up at their outer ends, as shown at $b$. The other ends of the rods C are made, as shown in Fig. 3, with the portions H bent up from the straight portions C, and those portions H pass through holes in the inclined board A or through staples or other devices for the purpose and are then bent, as shown at E, and extend downward and are provided with hooks $c'$. These hooks are swiveled to the bar B, which bar is made to slide longitudinally, as shown in Fig. 1. To the end of this sliding bar B is attached a connecting-rod $a$, which is attached at $A^2$ by a wrist-pin to the arm $d'$ of a crank-shaft $b'$, which turns in boxes $A'$ and $b^2$. This shaft extends diagonally upward from the girt or timber F to a portion of the frame below and in rear of the driver's seat, and is furnished at its upper end with a crank-arm $g$, to the upper end of which is attached the rod $f$, extending forward and furnished with a bar $a'$ and stirrup $e$ to receive the driver's foot. The forward end of the rod $f$ is hinged to another crank $a^2$, which is hinged to the seat-standard or some other part of the frame. By means of this stirrup and its connections the driver can, by pushing his foot forward, turn the crank-shaft $b'$ in its bearings and swing the cradle, composed of the rods C, from the position shown in Fig. 2 to the position shown in Fig. 1, and when in this position the crank $a^2$ has passed nearly to the center of motion, and the driver with his foot can readily hold it there as long as he pleases. When the weight of one or more sheaves is in the carrier and the driver withdraws his foot from the stirrup or relieves his hold thereon, the rods working freely in their connection with the board A, and the crank-shaft $b'$, turning in its bearings, impelled by the weight of the bundles, will slide the bar B forward, and the rods C will assume the positions as shown in Fig. 2, and the accumulated bundles will be discharged upon the ground. If the driver desires to lock the bundle-carrier in its extended position, he will push the device forward, so that the crank $a^2$ has passed its center of motion. By hinging the board A, to which the rods C are attached, to the girt or end piece of the frame F, I provide another means for the whole to yield upwardly in case an obstruction is encountered in the movements of the machine.

As shown in Fig. 1, G is a bent rod attached at one end by a hinge $c$ to the binder, so as to rise freely, but limited in its downward motion, or it may be attached to any suitable place on the binder or harvester. It extends forward over the sheaf-carrier, and is for the purpose of retaining the sheaves in the carrier until such time as the driver desires to dump them. By this arrangement I can make the sheaf-carrier much smaller and still carry a large load of sheaves. When the carrier is in position to receive the load of sheaves, it is as represented in Fig. 1. When it is moved into position to dump the load, it is as shown, detached in Fig. 2, and presents an appearance very similar to a bird's wing when folded, and the result is a quick and perfect deposit of the sheaves.

It will be seen from the above description, taken in connection with the drawings, that the peculiar effect described when the fingers are dropped is owing to the fact that the portions H of the fingers or rods C form journals on which the rods C rotate, which journals are at an angle with the receiving portion of the rods and have their bearings in the inclined board A, so that as the sliding bar B moves toward the front of the machine, the rods C, rotating on their journals H, will have a compound downward and backward motion, and not only drop, but as they drop fold toward the side of the machine. In this way the bundle will be deposited at once and in a heap convenient for loading.

The peculiarity of my invention is that the sheaf-carrier is not tilted in either direction. The rods or fingers which form the cradle when in position to receive the sheaves extend in planes at right angles, or nearly so, to the path of the machine and are changed to discharge the sheaves to a drooping position parallel, or nearly so, to the path of the machine, as before stated, similar to a bird's wing when folded, and if the ends of the rods are lower than their attachment they are attached flexibly, so as to yield to any obstruction which may be in their path. It is plain that the connecting-rod $a$, being swiveled at $e$ to the bar B, the bar B and the rod C, connected to it may be turned up and held up by any suitable means, as shown in Fig. 4. The rod G, being also loosened at its connection, can be turned around so that its curved portion will extend inward, and by this arrangement I secure a harvester and binder with a sheaf carrier and dumper attached without any addition to the width of the machine when it is required to transport the same or pass narrow openings in fences, and this can be accomplished without the removal or displacement of any of the parts.

It is plain from the foregoing description with reference to the drawings that when this bundle-carrier has delivered its load it is folded very nearly under the platform of the binder and does not increase to any material extent the width of the machine, which would make an obstruction to its passage through narrow gateways, provided the machine was driven straightwise through the gate. It frequently happens, however, that the opening or gateway to the field is somewhat narrower than the width of the machine, in which case it is necessary for the driver to buck or cramp the machine and gradually to work it through the gateway, and it is apparent that the ends of the rods forming the cradle when folded and the machine is backed might run into the ground. It is with reference to this condition of facts that the next preceding clause of this specification is written.

I am aware that sheaf carriers and dumpers have hitherto been used which consisted of a series of rods mounted in a supporting-board and extending transversely to the path of the machine when in position to receive the sheaves, and which have been revolved to form an incline over which the sheaves may slide; but I am not aware that any one has hitherto used a series of rods which in their rotation on their journals would move from a position transverse to the path of the machine downwardly and backwardly and fold toward the side of the machine to discharge the bundles.

What I therefore claim as my invention is—

1. The combination, with a harvester, of a sheaf-carrier composed of projecting rods, each having a journal at an angle to the projecting portion of the rod and being connected to the harvester by a bearing constructed and arranged so as to cause each rod in dumping to move downwardly and laterally toward its support.

2. The combination, with a harvester, of a sheaf-carrier composed of laterally-projecting rods, each having a journal at an angle to the projecting portion of the rod and being connected to the side of the harvester by a bearing so inclined as to cause each rod in dumping to move downwardly and backwardly toward the side of the machine.

3. The combination, with a harvester, of a sheaf-carrier composed of a series of laterally-projecting rods, each having a journal at an angle to the projecting portion of the rod and being connected to the side of the harvester by a bearing so inclined as to cause each rod in dumping to move downwardly and backwardly toward the side of the machine, and a bar to which the inner ends of all the rods are connected to cause them to move concurrently.

4. The combination, with a harvester, of a sheaf-carrier composed of a series of laterally-projecting rods, each having a journal at an angle to the projecting portion of the rod and being connected to the side of the harvester by a bearing so inclined as to cause each rod in dumping to move downwardly and backwardly toward the side of the machine, a bar to which the inner ends of all the rods are connected, and connections between the bar and a lever within reach of the driver.

5. A sheaf carrier and dumper composed of a series of laterally-projecting rods, each rod having a journal at an angle to the projecting portion of the rod and being attached to the side of the machine by a bearing so inclined as to cause each rod to move downwardly and backwardly toward the side of the machine, substantially as and for the purpose specified.

6. In a sheaf carrier and dumper, the combination, with a series of laterally-projecting rods, each rod having a journal at an angle to the projecting portion of the rod and being attached to the side of the machine by a bearing so inclined as to cause each rod to move downwardly and backwardly toward the side of the machine, of a longitudinally-sliding bar, to which the inner ends of said rods are swiveled, substantially as and for the purpose described.

7. In a sheaf carrier and dumper, the combination, with a series of laterally-projecting rods, each rod having a journal at an angle to the projecting portion of the rod and being attached to the side of the machine by a bearing so inclined as to cause each rod to move downwardly and backwardly toward the side of the machine, of the longitudinally-sliding bar, to which the inner ends of said rods are swiveled, and operating-levers within reach of the driver in his seat connected with said bar, substantially as and for the purpose described.

8. The combination, with a harvester and binder, of the board A, hinged to the side of the machine, the rods C, independently journaled therein by journals H at an angle to the receiving portion of said fingers, and a sliding bar B, connecting the inner ends of said rods, said board being hinged in such a manner that it may be turned up with the carrier, so as to narrow the width of the machine.

GEORGE HUTCHINS HOWE.

Witnesses:
W. LOVEGROVE,
HERMAN L. MATZ.